United States Patent [19]

Turner et al.

[11] 4,146,254
[45] Mar. 27, 1979

[54] COUPLER FOR TUBING

[75] Inventors: Larry G. Turner, Waterford; James H. Hastings, Sterling Heights; Patrick B. Jonte, Utica, all of Mich.

[73] Assignee: Bristol Products, Inc., Bristol, Ind.

[21] Appl. No.: 777,541

[22] Filed: Mar. 16, 1977

Related U.S. Application Data

[63] Continuation-in-part of Ser. No. 672,384, Mar. 31, 1976, abandoned.

[51] Int. Cl.² ............................................. F16L 17/02
[52] U.S. Cl. .................... 285/105; 285/175; 285/331; 285/340; 285/351; 285/369; 285/383; 285/423
[58] Field of Search ............... 285/340, 104, 105, 423, 285/351, 110, 175, 331, 369, 383

[56] References Cited

U.S. PATENT DOCUMENTS

| 2,272,811 | 2/1942 | Nathan | 285/340 |
| 3,312,483 | 4/1967 | Leadbetter et al. | 285/423 X |
| 3,532,367 | 10/1970 | Roos | 285/302 |
| 3,600,010 | 8/1971 | Downs et al. | 285/351 X |
| 3,633,944 | 1/1972 | Hamburg | 285/340 |
| 3,645,567 | 2/1972 | Reinker | 285/340 |
| 3,743,326 | 7/1973 | Courtot | 285/105 |
| 3,837,687 | 9/1974 | Leonard | 285/340 |
| 3,874,709 | 4/1975 | MacDonald | 285/340 |
| 4,005,884 | 2/1977 | Drori | 285/105 |

FOREIGN PATENT DOCUMENTS

| 2004921 | 8/1971 | Fed. Rep. of Germany | 285/340 |
| 1165431 | 10/1969 | United Kingdom | 285/111 |

Primary Examiner—Dave W. Arola
Attorney, Agent, or Firm—Oltsch, Knoblock & Hall

[57] ABSTRACT

A coupler which is for tubing and which has a tube receiving bore therein. A sealing ring, spacer ring and lock ring are coaxially located within the coupler bore. When a tube is inserted into the coupler bore, the sealing ring makes contact between the coupler and tube with the spacer and locking ring cooperating to cause the locking ring when the tube is pressurized to firmly engage the tube, thus preventing the tube from being withdrawn from the coupler.

30 Claims, 13 Drawing Figures

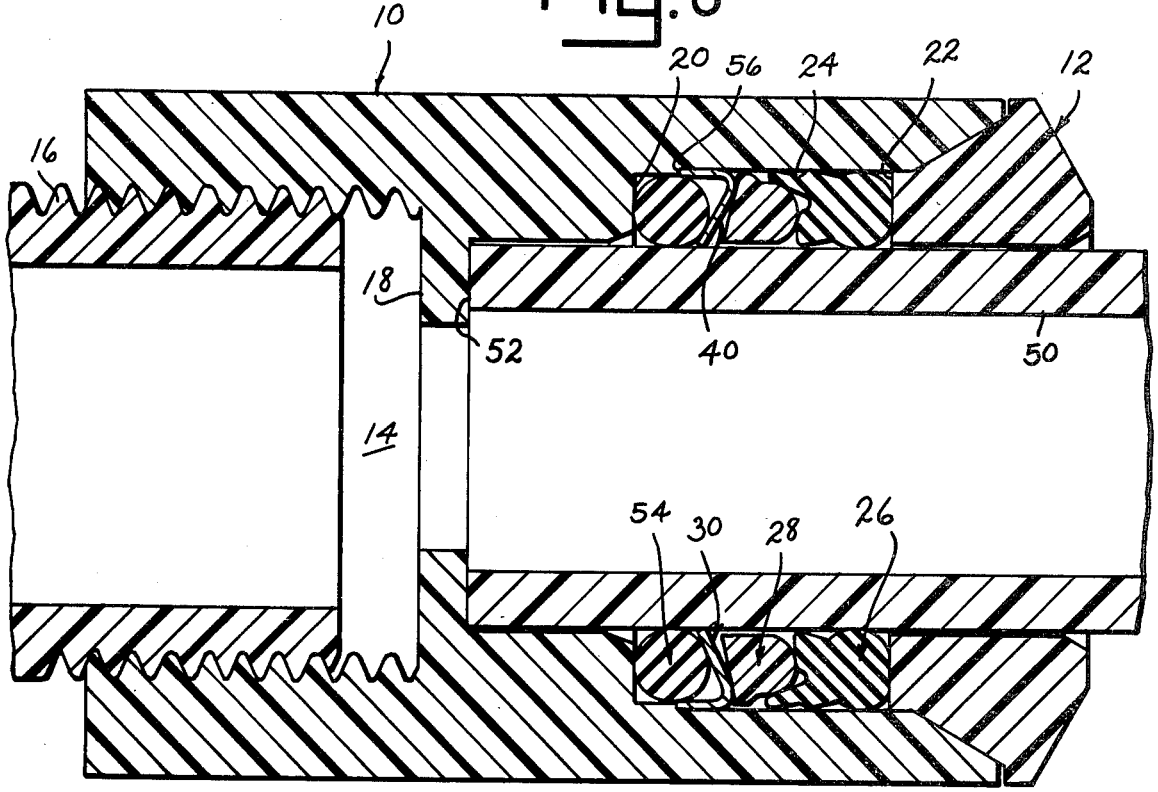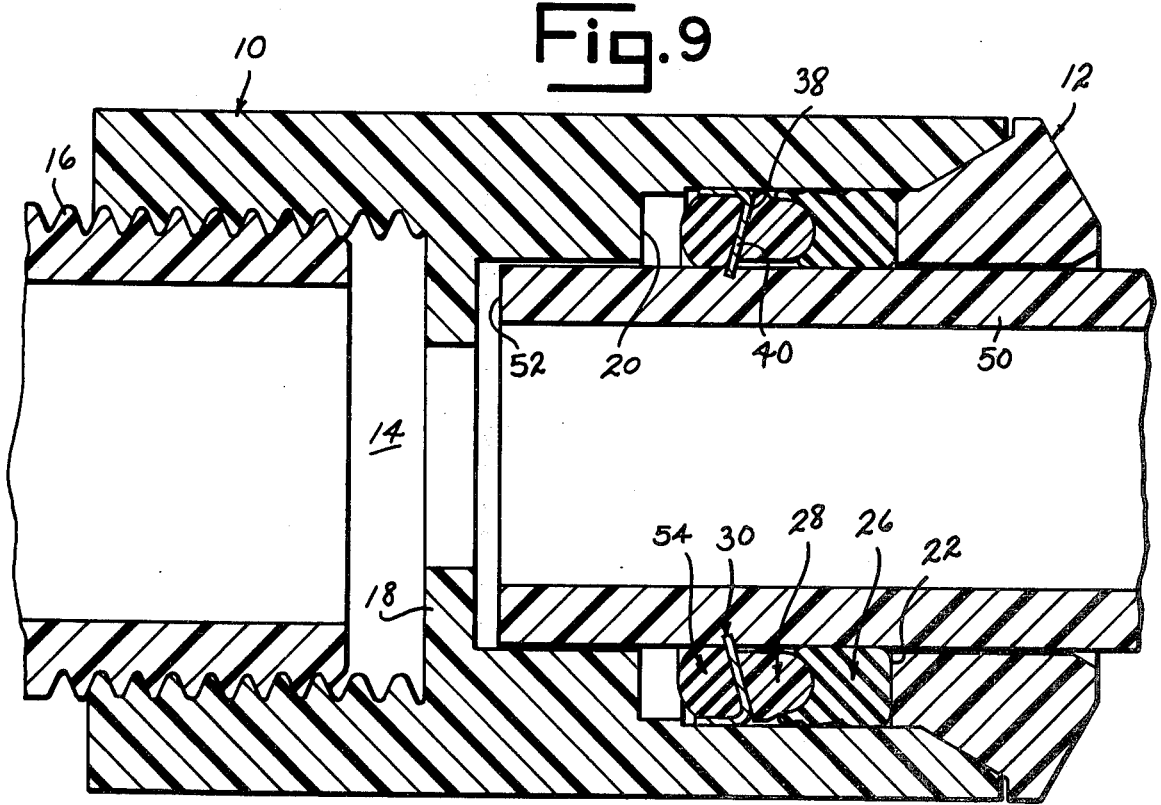

COUPLER FOR TUBING

CROSS REFERENCE TO RELATED APPLICATION

This is a continuation-in-part of application Ser. No. 672,384, filed Mar. 31, 1976, and now abandoned.

BACKGROUND OF THE INVENTION

This invention relates to a coupler for tubing and will have specific, but not limited, application to a coupler for flexible tubing.

Couplers have long been utilized to secure metallic tubing, such as copper, to other tubing or to a fitting. In recent years non-metallic tubing of a generally rigid nature, such as that formed from polyvinylchloride, has been utilized in place of the copper or similar metallic tubing. In connecting such generally rigid non-metallic tubing, the couplers of the prior art performed in a generally satisfactory manner. With the development of flexible, non-metallic tubing, such as that formed from polybutylene, it was found that the prior art type couplers would not perform satisfactorily when the flexible tubing was used at elevated temperatures and pressures. As the non-metallic flexible tubing would become heated, such as to 180° F., and utilized at pressures such as between 180 and 220 p.s.i., the tubing would soften and slip from its coupler.

With the following described invention a coupler has been developed which will not only serve to couple metallic and non-metallic substantially rigid tubing but also flexible tubing which can be used at elevated temperatures and pressures without slipping or becoming disconnected from its coupler.

SUMMARY OF THE INVENTION

The coupler of this invention includes a housing having a bore through it. In the housing bore, located between longitudinally spaced shoulders, are seal means, spacer means and locking ring means. The locking ring means includes a flexible inner frusto conical part which terminates in an annular tube contacting edge. The spacer which is rigid contacts the frusto conical portion of the ring means and serves as a guide when the tube is inserted into the coupler and through the spacer and ring means with the seal means which is resilient engaging both the tube and coupler housing. When the tube is pressurized with a fluid, the spacer and ring means cooperate in such a manner that the frusto conical portion of the ring means is fixed toward the tubing into a flexed generally transverse position with its annular tube contacting edge being forced into firm locking engagement with the tubing so as to prevent the tubing from being withdrawn from the coupler housing even when the tubing is softened by being subjected to fluid of an elevated temperature.

The seal means is formed by both a flexible lip which enhances its sealing characteristics and an O-ring portion which serves to prevent leakage into the tube when a negative pressure, such as a vacuum, is maintained within the tube.

Accordingly, it is an object of this invention to provide a coupler for flexible tubing.

Another object of this invention is to provide a connector of simple and reliable operation for tubing of both the rigid and flexible type.

Still another object of this invention is to provide a coupler of reliable operation for flexible tubing which is subjected to high operating temperatures and pressures.

And still another object of this invention is to provide a method by which tubing may be joined to a coupler.

Other objects of this invention will become apparent upon a reading of the invention's description.

BRIEF DESCRIPTION OF THE DRAWINGS

FIG. 8 is a longitudinal sectional view of still another embodiment of the coupler showing tubing inserted therein in unpressurized form.

FIG. 9 is a longitudinal sectional view of the coupler of FIG. 8 shown with the tubing in pressurized form.

DESCRIPTION OF THE PREFERRED EMBODIMENTS

Figure 1:
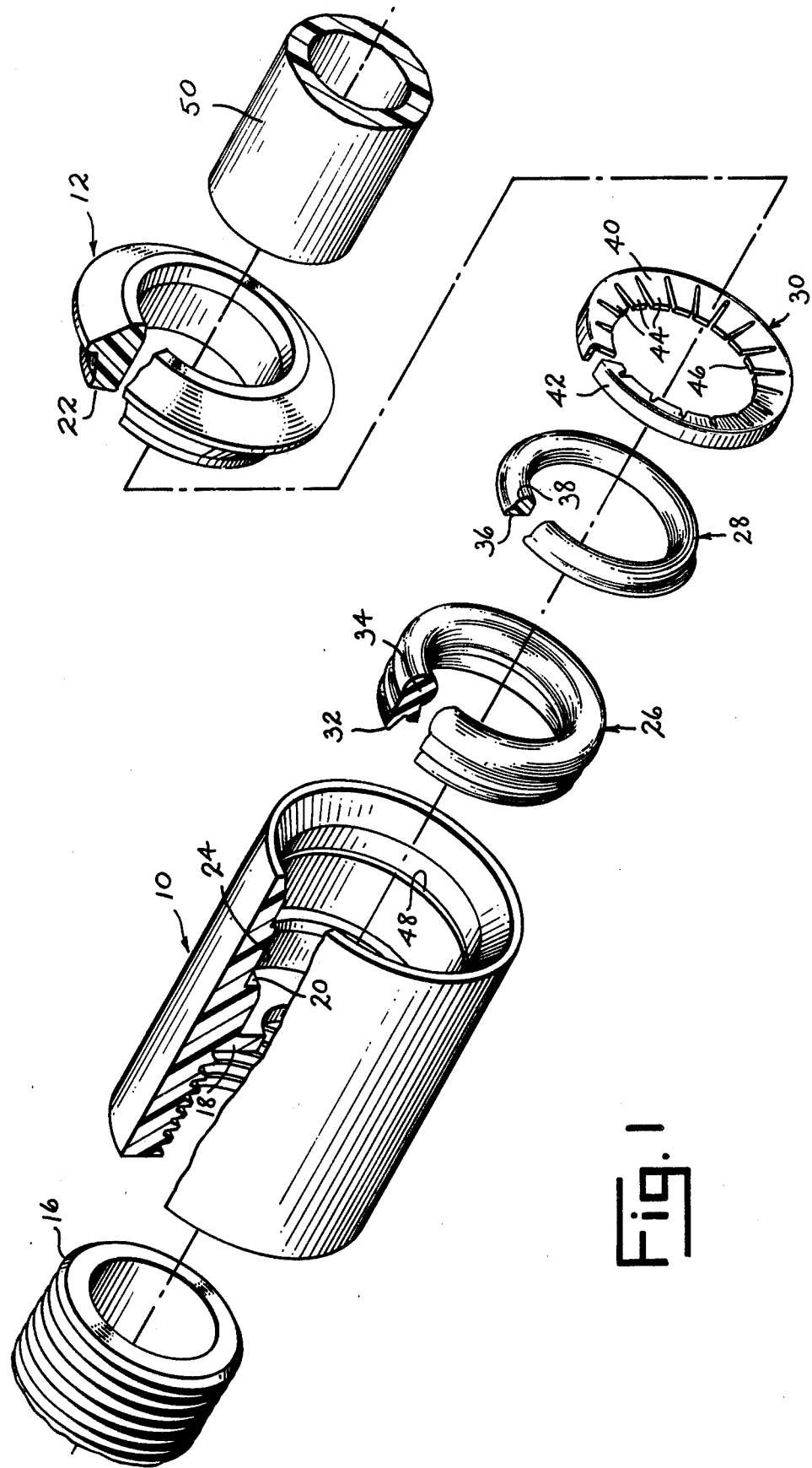
FIG. 1 is an exploded view of the components parts of the coupler of this invention shown in perspective form and with portions broken away for purposes of illustration.
Figure 2:
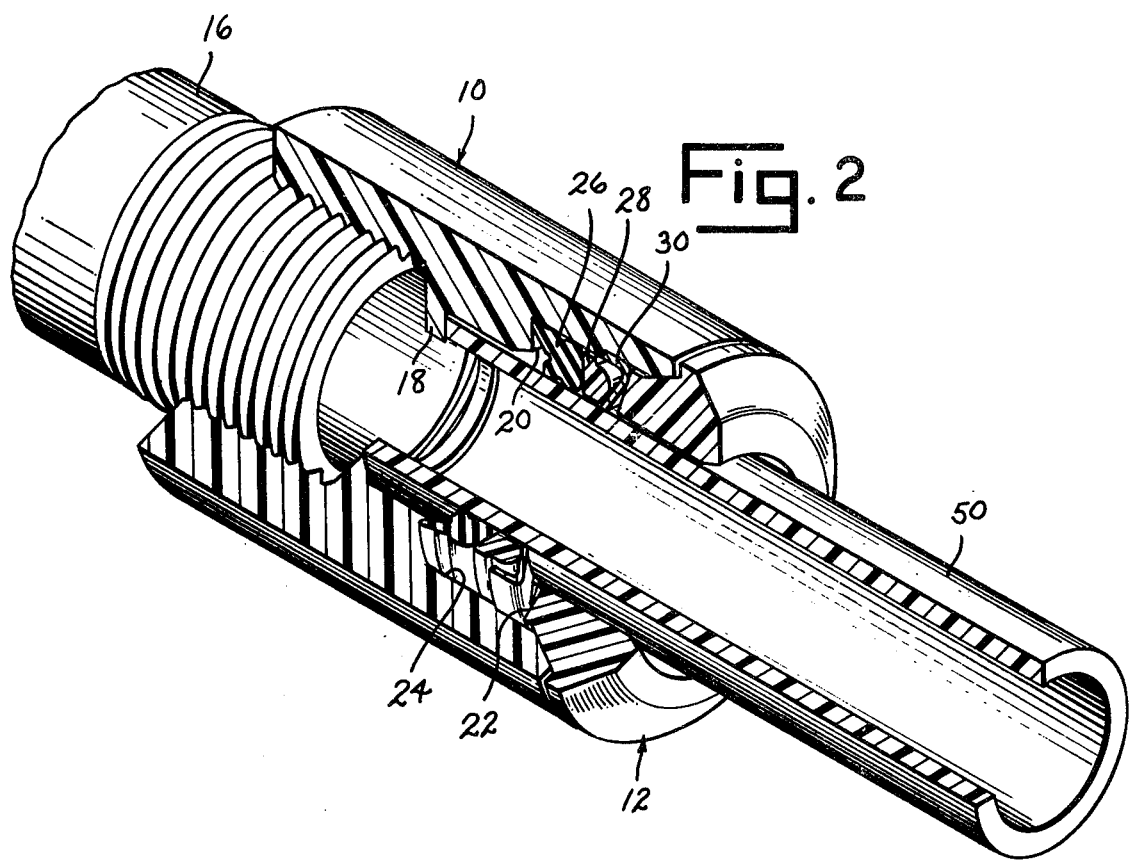
FIG. 2 is a perspective view of one embodiment of the coupler in assembled form and having tubing connected thereto with a portion of the coupler and tubing shown in sectional form for purposes of illustration.
Figure 3:
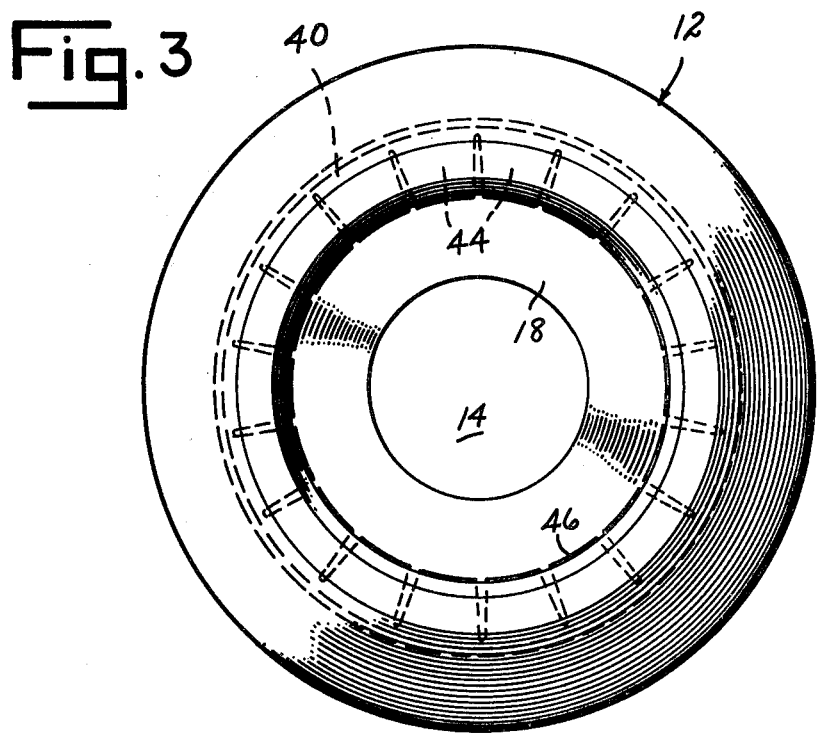
FIG. 3 is an end view of the coupler of FIG. 2 shown without the tubing.
Figure 4:
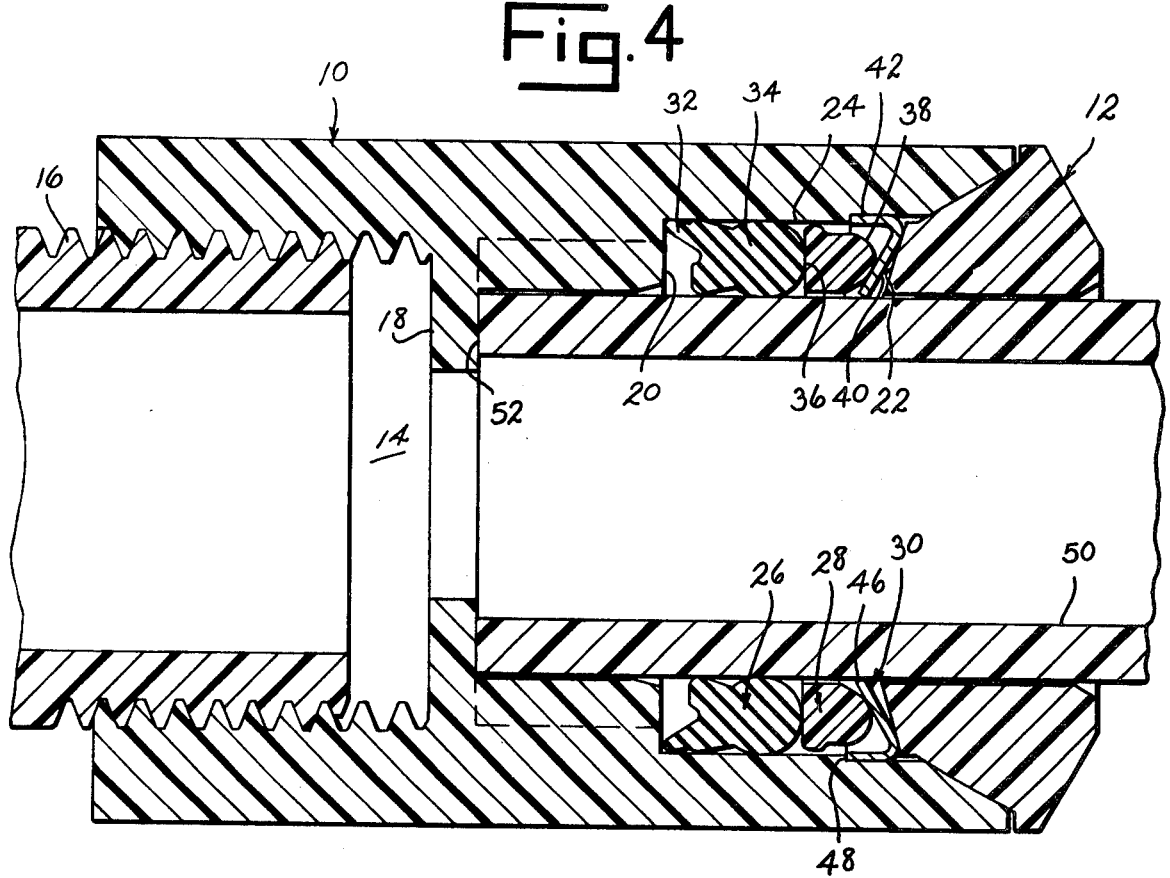
FIG. 4 is a longitudinal sectional view of the coupler of FIG. 2 showing the tubing in an unpressurized form.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The couplers illustrated in the figures include a housing having a body part 10 and a cap part 12. The housing of the coupler may be of a unitary construction, although, as shown in the illustrated embodiments, it is preferred for the housing to have a body part 10 fitted with a cap part 12 for ease of assembly of the coupler. The coupler housing has a central through bore 14. One end of body part 10 is internally threaded within bore 14 so as to receive an interconnecting threaded pipe or fitting 16. An annular shoulder 18 protrudes into bore 14 approximately mid-way between the ends of body part 10. Bore 14 at the opposite end of body part 10 is of an expanded dimension so as to form an annular shoulder 20 in the side wall of the bore. Cap part 12 of the housing is fitted into the expanded end of bore 14 and attached, such as by an adhesive or spin welding, to body part 10. The inner end of cap part 12 forms a beveled annular shoulder 22 within housing bore 14. Shoulders 20 and 22 are opposed and in conjunction with side wall 24 of the expanded portion of bore 14 serve to define an annular groove within the coupler housing. Body part 10 and cap part 12 of the coupler housing may be formed of a metallic machined or cast material or of a molded plastic composition.

An annular resilient seal 26, an annular rigid spacer 28 and a lock ring 30 are located within the interior of the coupler housing between shoulders 20 and 22 and in substantial coaxial alignment with housing bore 14. Seal 26, which may be of a rubber material, includes a flexible cup-defining lip portion 32 and an O-ring portion 34. Spacer 28 is of a rigid material, such as hardened plastic, and includes a flattened edge 36 and a rounded edge 38. Lock ring 30 is of a spring steel construction and includes a frusto conical portion 40 and a flange portion 42. The angle between frusto conical portion 40 and flange portion 42 of the ring without the tube inserted is preferably between 45 and 55 degrees. The frusto conical portion 40 of ring 30 is formed by a plurality of radially spaced flexible tabs 44 which cooperate at their free ends to define a tube contacting inner edge 46.

In the embodiment of the coupler shown in FIGS. 1-5 seal 26 is positioned adjacent shoulder 20 with its lip portion 32 contacting side wall 24 of housing bore 14. Spacer 28 is located next to seal 26 with its flattened edge 36 adjacent O-ring portion 34 of the seal. Lock ring 30 is positioned next to spacer 28 with its frusto conical portion 40 positioned adjacent shoulder 22 of the housing and preferably in contact with the rounded edge 38 of the spacer. Flange portion 42 of ring 30 contacts side wall 24 of bore 14 and preferably abuts a small locating shoulder 48 formed in the side wall. The internal diameter of seal 26 as measured across its O-ring portion 34 and the internal diameter of lock ring 30 as measured across inner edge 46 of its frusto conical portion 40 is slightly less than the diameter of the tube receiving part of bore 14 to enable the seal and ring to make sliding engagement with tube 50 as it is inserted into the coupler housing.

To utilize the coupler above described, tube 50 having an external diameter which is slightly less than the diameter of housing bore 14 but which is slightly greater than the inner diameters of seal 26 and lock ring 30 is inserted into bore 14 through cap part 12. Tube 50 first contacts inner edge 46 of the frusto conical portion 40 of ring 30 which slides over the tube surface and serves as a guide as the tube advances through spacer 28 and seal 26 and abuts shoulder 18 within housing body part 10 at its end 52. The internal diameter of spacer 28 exceeds the external diameter of tube 50 so as not to interfere with the insertion of the tube into housing bore 14. With tube 50 fully inserted into bore 14, O-ring portion 34 of the seal and inner edge 46 of ring frusto conical portion 40 peripherally contact the tube.

Figure 5:
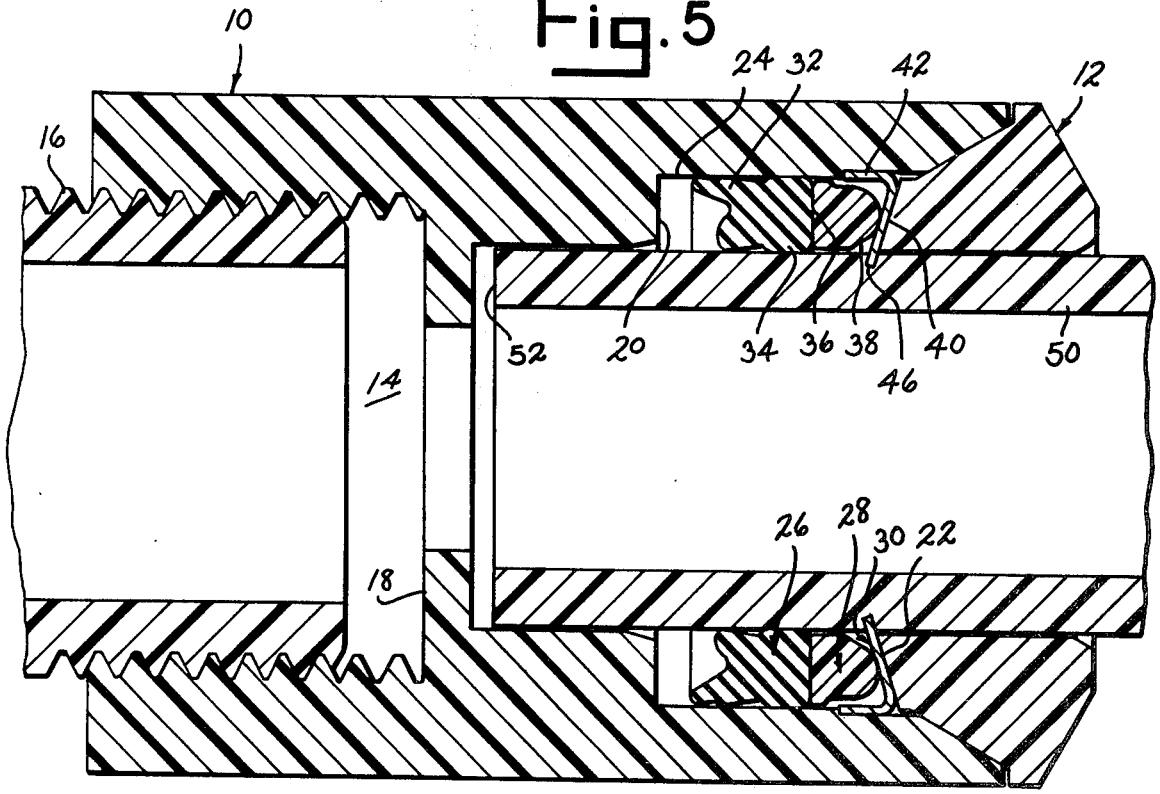
FIG. 5 is a longitudinal sectional view of the coupler of FIG. 2 showing the tubing in a pressurized condition.

Upon the introduction of a fluid, either in liquid or gaseous form, into tube 50 to cause its pressurization, a portion of the fluid passes between tube end 52 and shoulder 18 of the housing body part, along bore 14 between the tube and housing body part and into the area between shoulder 20 and seal 26. This causes tube 50 to be pushed away from housing shoulder 18 and seal 26 to be urged toward cap part 12 with spacer 28 being forceably pressed against the flexible frusto conical portion 40 of lock ring 30. The force imposed by spacer 28 against lock ring 40 causes the lock ring to be straightened into a general transverse orientation, abutting shoulder 22 within the coupler housing. As frusto conical portion 40 of the lock ring 30 is straightened into its transverse position, inner edge 46 of the ring bites deeper into tube 50 as shown in FIG. 5 to firmly lock the tube within the coupler. This bite of inner edge 46 of lock ring 30 into tube 50 is sufficient to retain the tube, which may be formed of polybutylene, within the coupler even when the temperature of the fluid passing through the tube is sufficiently high so as to cause the tube to become quite pliable.

Further bending or inversion of frusto conical portion 40 of the lock ring is prevented due to its abutment with shoulder 22 of the coupler housing. It is to be understood that during pressurization of tube 50 the straightening of ring frusto conical portion 40 occurs very rapidly with spacer 28 serving the function of applying a uniform circumferential force to the frusto conical portion to cause a uniform bite of inner edge 46 of the ring into tube 50. Lip portion 32 of seal 26 forms a cup-shaped seal end edge which prevents any fluid from leaking past the seal, around the spacer, through the lock ring and out cap part 12 of the coupler.

Figure 6:
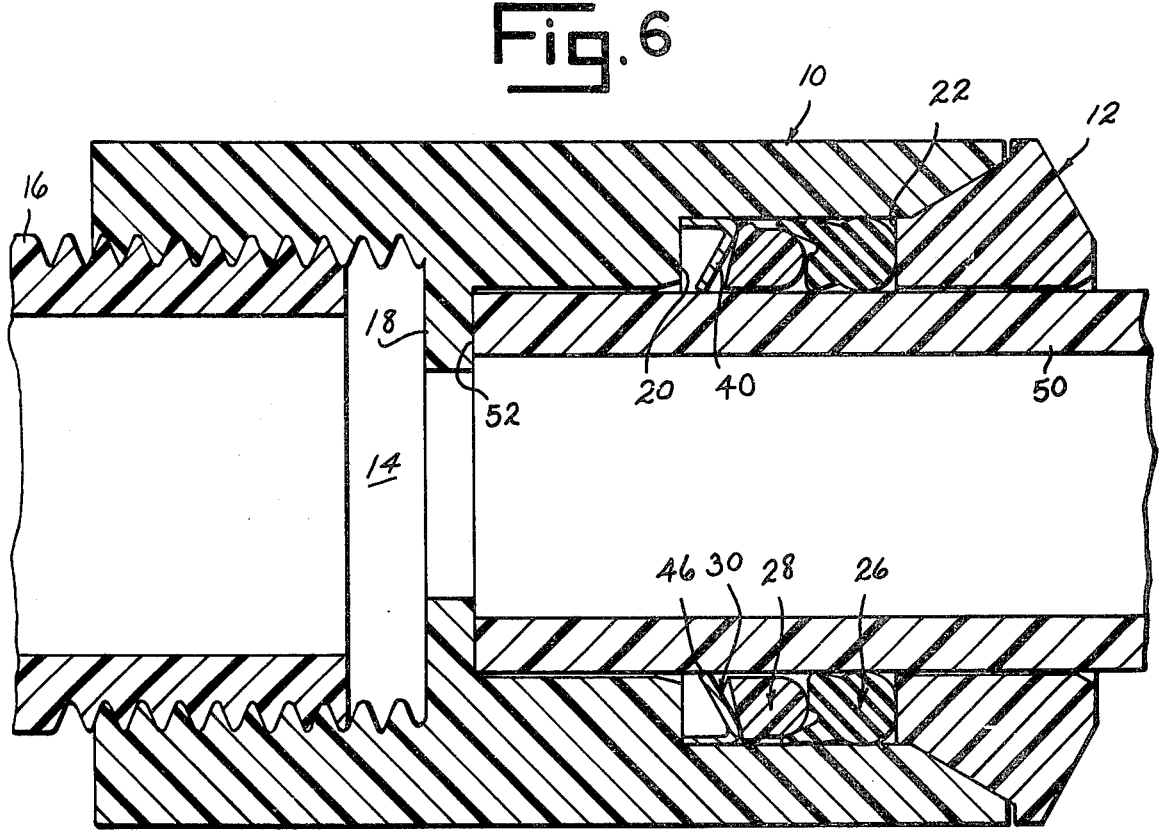
FIG. 6 is a sectional view of a modified embodiment of the coupler showing tubing inserted therein in unpressurized form.
Figure 7:
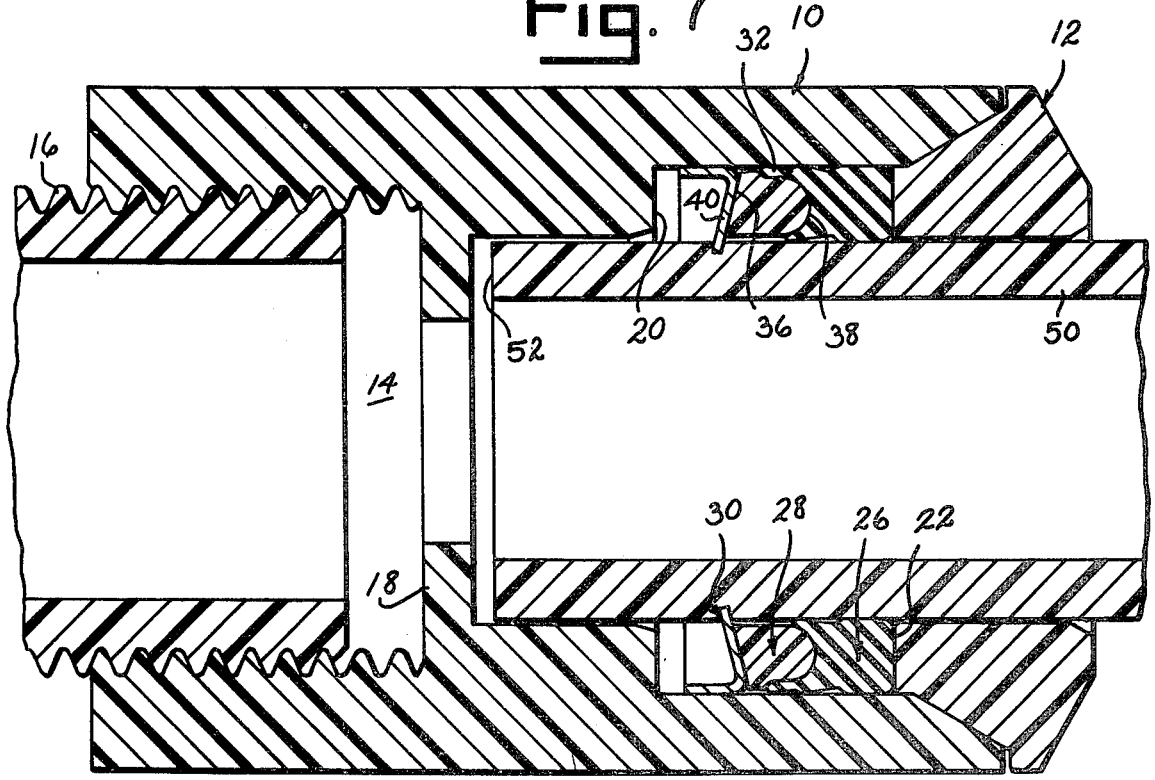
FIG. 7 is a longitudinal sectional view of the coupler of FIG. 6 shown with the tubing in pressurized form.
Figure 10:
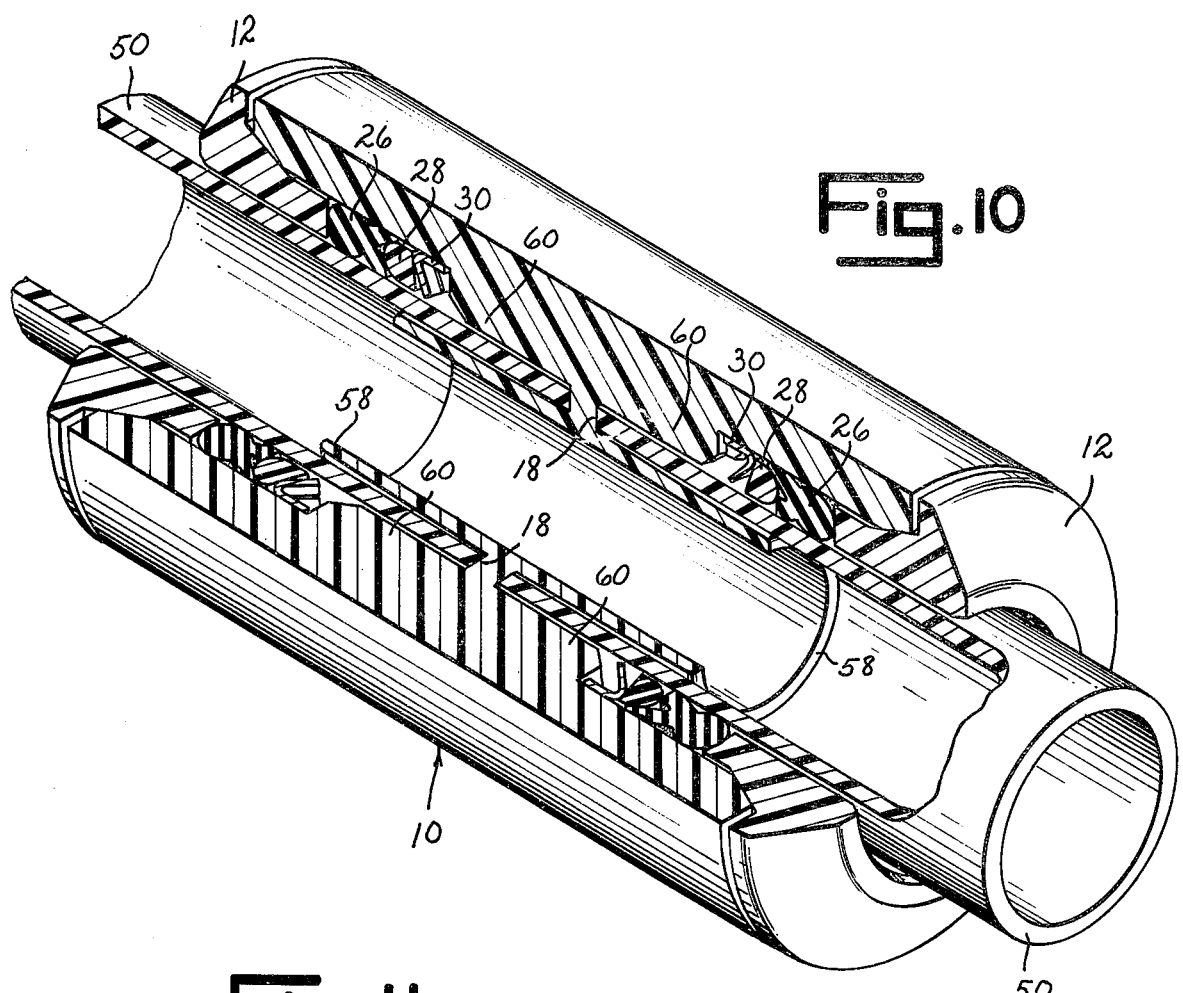
FIG. 10 is a perspective view of another embodiment of the coupler in assembled form with a portion of the coupler and connected tubing shown in sectional form for purposes of illustration.

The embodiment of the coupler shown in FIGS. 6 and 7 is substantially similar to that described for the coupler illustrated in FIGS. 1-5, with the exception that the order of assembly of seal 26, spacer 28 and lock ring 30 between shoulders 20 and 22 within the coupler housing is reversed. Also shoulder 22 of cap part 12 is flattened and edge 36 of spacer 38 is beveled. Lock ring 30 is positioned adjacent shoulder 20 with seal 26 being positioned adjacent shoulder 22 and spacer 28 being located between the lock ring and seal. During insertion of tube 50 into this embodiment of the coupler, the tube does not engage inner edge 46 of frusto conical portion 40 of lock ring 30 until it is past seal 26. In this arrangement of the lock ring, spacer and seal within the coupler housing, tube 50 can be inserted into the coupler and through seal 26 before contacting ring 30, thus allowing only its distal end to be scraped by the ring, while that portion of the tube encircled by seal 26 remains unmarred by the lock ring to allow a more even area of contact between the tube and the seal.

In FIG. 6 the tube is shown in unpressurized form. When pressurized fluid is introduced into tube 50, the tube will be urged slightly away from shoulder 18 in housing body part 10 and tube contacting frusto conical portion 40 of lock ring 30 will be shifted with the tube into its general transverse tube-engaging position shown in FIG. 7, causing the tube to be more firmly locked within the coupler. Inversion of frusto conical portion 40 of the lock ring is prevented by its abutment with beveled edge 36 of spacer 38. Additionally, the rounded edge 38 of the spacer will enter the cup formed by lip portion 32 in seal 26, causing the seal to be more firmly wedged into sealing engagement between the coupler housing and tube 50. In this embodiment it is important that lock ring frusto conical portion 40 be constructed so as to shift uniformly and rapidly from its beveled position shown in FIG. 6 into its firmly interlocking position shown in FIG. 7 upon the pressurization of tube 50.

In the embodiment of this invention shown in FIGS. 8 and 9, lock ring 30, spacer 28 and seal 26 are positioned in a similar manner between housing shoulders 20 and 22 as in the embodiment in FIGS. 6 and 7, with the addition of a resilient O-ring seal 54 introduced between shoulder 20 and frusto conical portion 40 of the lock ring. Additionally, it is also preferable that a slight shoulder 56 be formed in sidewall 24 of housing body part 10 for the purpose of seating lock ring 30. In FIG. 8 the coupler is shown with tube 50 in its unpressurized form. Upon pressurization of the tube, such as by the introduction of pressurized fluid, the tube is urged slightly away from internal housing shoulder 18 with the fluid contacting seal 54 in front of shoulder 20 to cause the seal to be urged against the frusto conical portion 40 of lock ring 30. The pressure of seal 54 causes frusto conical portion 40 to be urged into its general transverse interlock position with tube 50 as shown in FIG. 9. In this manner seal 54 functions similarly to seal 26 in the embodiment shown in FIGS. 4 and 5, causing a generally uniform bending pressure to be applied circumferentially about lock ring 30. The inversion of the lock ring frusto conical portion 40 past its tube interlock position is prevented by its abutment with beveled edge 38 of spacer 28. Seal 26 is wedged into its sealing position between the coupler housing and tube in a manner like that described for the embodiment in FIGS. 6 and 7.

The embodiment of the coupler shown in FIGS. 10-13 is used to join two like tubes 50 together and includes two sets of cooperating seals 26, spacers 28 and lock rings 30. Each seal, spacer and lock ring set operates in its tube gripping function substantially similar to the seal, spacer and lock ring in the embodiment of the coupler illustrated in FIGS. 6 and 7. Body part 10 includes a pair of tubular mandrel parts 58 which are concentric with body part bore 14 and which extend integrally from shoulders 18. When a tube 50 is inserted into one end of body part 10 it fits snugly over the mandrel part 58 therein with end 52 of the tube abutting a shoulder 18. In this manner each mandrel part 58 serves as a means for centering the tubing as it is inserted into the coupler. This embodiment of body part 10 may be provided with a continuous offset annular shoulder 20 as described in the previous embodiments, or, as illustrated, may include a plurality of circumferentially spaced, radially disposed ribs 60 whose end faces 62 cooperate to form a shoulder which is functionally similar to shoulder 20 of the other embodiments. Ribs 60 are utilized in the embodiment of FIGS. 10-13 instead of a solid annular shoulder for the purpose of conserving the amount of material used in body part 10.

Figure 11:
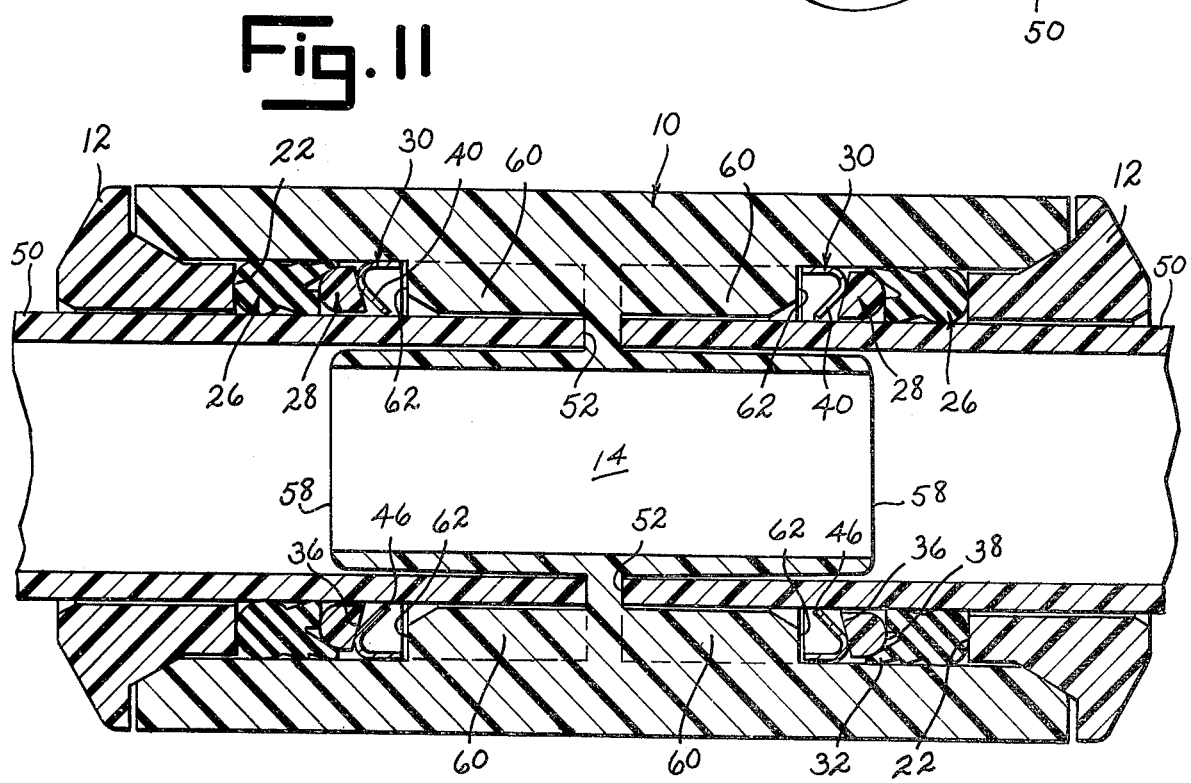
FIG. 11 is a longitudinal sectional view of the coupler of FIG. 10 showing the tubing in an unpressurized form.
Figure 12:
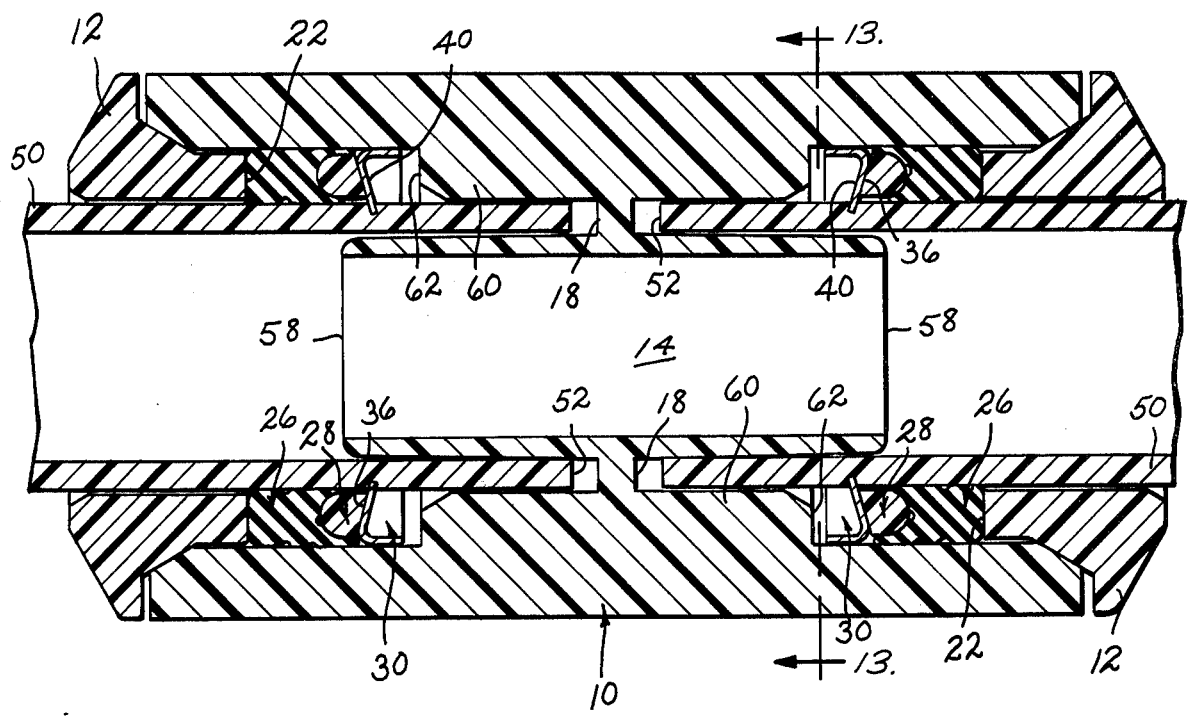
FIG. 12 is a longitudinal sectional view of the coupler of FIG. 10 showing the tubing in a pressurized condition.
Figure 13:
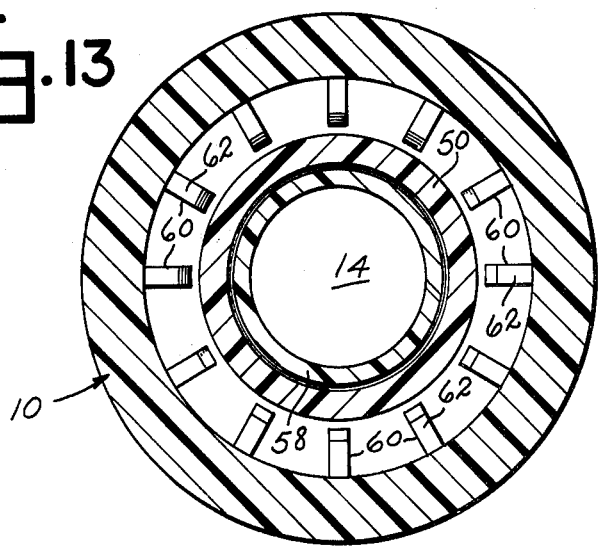
FIG. 13 is a cross sectional view taken along line 13—13 of FIG. 12.

A lock ring 30 is positioned next to end faces 62 of ribs 60 with a seal 26 being positioned next to shoulder 22 of each cap part 12 and a spacer 28 being located between each lock ring and seal. As in the embodiment of the coupler shown in FIGS. 6 and 7, when each tube 50 is inserted into the coupler the tube does not engage inner edge 46 of frusto conical portion 40 of lock ring 30 until it is past seal 26. In FIG. 11 tubes 50 are shown in unpressurized form. When pressurized liquid is introduced into tubes 50, the tubes will be urged slightly away from shoulders 18 of housing body part 10 and tube-contacting frusto conical portion 40 of each lock ring 30 will be shifted with its encircled tube into a general transverse tube-engaging position as shown in FIG. 12, causing the tubes to be more firmly locked within the coupler. Inversion of frusto conical portion 40 of each lock ring is prevented by its abutment with beveled edge 36 of the adjacent rigid spacer 28. Rounded edge 38 of each spacer will enter the cup formed by lip portion 32 of adjacent seal 26 to cause the seal to be more firmly wedged into sealing engagement between the coupler housing and its encircled tube.

A mandrel part 58, and, if desired, ribs 60 shown in the coupler embodiment of FIGS. 10-13, can be incorporated into each of the coupler embodiments previously described for use with the threaded portion of bore 14. In such couplers a tube 50 can be joined to a threaded fitting or pipe.

In each of the above described embodiments of the coupler of this invention it is the rapid but controlled movement of the frusto conical portion 40 of lock ring 30 into firm biting engagement with the outer surface of the inserted tube with the lock ring being prevented from complete inversion which causes the tube to be fixedly secured within the coupler. Although lock ring portion 40 could be stopped by cap part 12 or spacer 28 at a right angular tube-engaging position, it is preferable to have portion 40 engage the inserted tube at a forward angle, such as between five and thirty degrees, depending upon the size of the coupler and tube material, when shifted into its generally transverse orientation. This serves to strengthen the holding power of the lock ring. By constructing seal 26 with an O-ring portion in conjunction with a cup-defining lip, the coupler of this invention serves also to seal the interfitting tube against leakage during negative pressure situations. Also in the embodiment of FIGS. 1-5, spacer 28 prevents seal 26 from creeping around and between lock ring tabs 44 and perhaps lifting the tabs from tube engagement when softened at elevated operating temperatures and pressures.

It is to be understood that the invention is not to be limited to the details above given but may be modified within the scope of the appended claims.

What we claim is:

1. A coupler for tubing comprising a housing having first and second end portions and a bore therethrough extending from the first end portion to the second end portion thereof, said housing first end portion including means for securement to a member, said housing second end portion having longitudinally spaced internal shoulders and an exterior opening into said housing bore, one shoulder of said housing being located nearer said opening than the other shoulder of said housing, lock ring means having a flexible inner frusto conical portion terminating in an annular tube-contacting edge, rigid annular spacer means, annular resilient seal means, said ring and spacer and seal means seated side by side in a longitudinal abutting relationship between said shoulders in general coaxial alignment with said housing bore, said ring means being adjacent said one shoulder, said spacer means being next to the frusto conical portion of said ring means and between the ring means and said seal means, said seal means for providing a fluid seal between said coupler and a tube when said tube is inserted into said housing through said housing bore from said housing second end portion, said ring means frusto conical portion being shiftable from a first position in which its internal diameter is of one diametrical value into a second position in which its internal diameter is less than said one diametrical value and the outer diameter of said tube, said ring and spacer and seal means being mutually shiftable relative to said housing between said shoulders toward said one shoulder through the influence of fluid pressurization of said tube after insertion into said housing bore and through the ring and seal and spacer means in said housing second end portion to position said ring means frusto conical portion in its said second position with the annular edge of said ring means circumferentially engaging said tube and with said ring means contacting said one shoulder whereby the tube will be locked within said housing, said one shoulder constituting abutment means for contacting said ring means to locate the ring means frusto conical portion in its said second position and to prevent withdrawal of said ring and seal and spacer means from said housing second end portion through said opening therein.

2. The coupler of claim 1 wherein the frusto conical portion of said ring means is tapered toward said first end portion of the housing.

3. The coupler of claim 2 wherein said ring means includes an outer annular flange to which said frusto conical portion is joined, said housing including an annular side wall between said shoulders, said flange contacting said side wall.

4. The coupler of claim 3 wherein said angle between the flange and frusto conical portion of said ring means prior to pressurization is between 45 and 60 degrees.

5. The coupler of claim 3 wherein said ring means frusto conical portion is formed of a plurality of radially disposed tabs joined to said flange of the ring means.

6. The coupler of claim 1 wherein said spacer means is for urging said ring means frusto conical portion into abutment with said one housing shoulder when said tube is inserted within said housing bore and fluid pressurized.

7. The coupler of claim 6 wherein said one housing shoulder is at an acute angle to said housing through bore and defines said abutment means for said ring means frusto conical portion.

8. The coupler of claim 1 wherein said housing includes a body defining said other housing shoulder and a cap defining said one housing shoulder, means connecting said cap to said body.

9. The coupler of claim 1 wherein said seal means includes a flexible lip means for engagement with said housing and a body means connected to said lip means for engaging both said housing and tube when said tube is inserted into said housing bore.

10. The coupler of claim 1 wherein said ring means constitutes means for guiding the insertion of a tube into said housing bore.

11. A coupler for tubing comprising a housing having first and second end portions and a bore therethrough extending from the first end portion to the second end portion thereof, said housing first end portion including means for securement to a member, said housing second end portion having longitudinally spaced internal shoulders and an exterior opening into said housing bore, one shoulder of said housing being located nearer said opening than the other shoulder of said housing, lock ring means having a flexible inner frusto conical portion terminating in an annular tube-contacting edge, rigid annular spacer means, annular resilient seal means, said ring and spacer and seal means seated side by side in a longitudinal abutting relationship between said shoulders in general coaxial alignment with said housing bore, said ring means being adjacent said other shoulder, said spacer means being next to the frusto conical portion of said ring means and between the ring means and said seal means, said seal means for providing a fluid seal between said coupler and a tube when said tube is inserted into said housing through said housing bore from said housing second end portion, said ring means frusto conical portion being shiftable from a first position in which its internal diameter is smaller than the outer diameter of said tube into a second position in which its internal diameter is less than its internal diameter when in its first position, said ring and spacer means being mutually shiftable relative to said housing between said shoulders toward said one shoulder through the influence of fluid pressurization of said tube after insertion into said housing bore and through the ring and seal and spacer means in said housing second end portion to position said ring means frusto conical portion in its said second position with the annular edge of said ring means circumferentially engaging said tube and with said seal means contacting said one shoulder whereby the tube will be locked within said housing, said one shoulder constituting abutment means for contacting said seal means to locate said ring means frusto conical position in its said second position and to prevent withdrawal of said ring and seal and spacer means from said housing second end portion through said opening therein.

12. The coupler of claim 11 wherein the frusto conical portion of said ring means is tapered toward said first end portion of the housing.

13. The coupler of claim 12 wherein said ring means includes an outer annular flange to which said frusto conical portion is joined, said housing including an annular side wall between said shoulders, said flange contacting said side wall.

14. The coupler of claim 13 wherein said angle between the flange and frusto conical portion of said ring means prior to pressurization is between 45 and 60 degrees.

15. The coupler of claim 13 wherein said ring means frusto conical portion is formed of a plurality of radially disposed tabs joined to said flange of the ring means.

16. The coupler of claim 11 wherein said housing includes a body defining said other housing shoulder and a cap defining said one housing shoulder, means connecting said cap to said body.

17. The coupler of claim 11 wherein said ring means frusto conical portion abuts said spacer means when said tube is inserted within said housing bore and fluid pressurized, said spacer means defining stop means for said frusto conical portion.

18. The coupler of claim 11 wherein said spacer means includes an angled surface means for contacting said ring means frusto conical portion to position said frusto conical portion at an acute angle tapering toward said first end portion of the housing when said tube is inserted within said housing bore and fluid pressurized.

19. The coupler of claim 11 wherein said housing includes a plurality of circumferentially spaced radially disposed ribs within said bore, said ribs terminating in generally coplanar end faces defining said other housing shoulder.

20. The coupler of claim 19 wherein said housing includes a tubular mandrel means coaxially located within said bore for receiving in overlapping sliding cooperation the end of said tube.

21. The coupler of claim 20 wherein said ribs spacedly encircle said mandrel means.

22. A coupler for tubing comprising a housing having a first and second end portions and a bore therethrough extending from the first end portion to the second end portion thereof, said housing first end portion including means for securement to a member, said housing second end portion having longitudinally spaced internal shoulders and an exterior opening into said housing bore, one shoulder of said housing being located nearer said opening than the other shoulder of said housing, lock ring means having a flexible inner frusto conical portion terminating in an annular tube-contacting edge, rigid annular spacer means, first and second annular resilient seal means, said ring and spacer and both seal means seated side by side in a longitudinal abutting relationship between said shoulders in general coaxial alignment with said housing bore, said first seal means being positioned adjacent said one of the housing shoulders and said second seal means being positioned adjacent said other of the housing shoulders, said ring means being positioned next to said second seal means, said spacer means being positioned between said ring means and first seal means next to the frusto conical portion of the ring means, said first and second seal means for providing a fluid seal between said coupler and a tube when said tube is inserted into said housing through said housing bore from said housing second end portion, said ring means frusto conical portion being shiftable from a first position in which its internal diameter is of one diametrical value and a second position in which its internal diameter is less than said one diametrical value and the outer diameter of said tube, said ring and spacer and second seal means being mutually shiftable relative to said housing between said shoulders toward said one shoulder through the influence of fluid pressurization of said tube after insertion into said housing bore and through the ring and spacer and both seal means in said housing second end portion to position said ring means frusto conical portion in its said second position with the annular edge of said ring means circumferentially engaging said tube and with said first seal means contacting said one shoulder whereby the tube will be locked within said housing, said one shoulder constituting abutment means for contacting said first seal means to locate said ring means frusto conical portion in its said second position and to prevent withdrawal of said ring and spacer and both seal means from said housing second end portion through said opening therein.

23. The coupler of claim 22 wherein the frusto conical portion of said ring means is tapered toward said first end portion of the housing.

24. The coupler of claim 23 wherein said ring means includes an outer annular flange to which said frusto conical portion is joined, said housing including an annular side wall between said shoulders, said flange contacting said side wall.

25. The coupler of claim 24 wherein said angle between the flange and frusto conical portion of said ring means prior to pressurization is between 45 and 60 degrees.

26. The coupler of claim 24 wherein said ring means frusto conical portion is formed of a plurality of radially disposed tabs joined to said flange of the ring means.

27. The coupler of claim 22 wherein said housing includes a body defining said other housing shoulder and a cap defining said one housing shoulder, means connecting said cap to said body.

28. The coupler of claim 22 wherein said first seal means includes a flexible lip means for engagement with said housing and a body means connected to said lip means for engaging both said housing and said tube when said tube is inserted into said housing bore.

29. The coupler of claim 22 wherein said ring means constitutes means for guiding the insertion of a tube into said housing bore.

30. The coupler of claim 23 wherein said spacer means includes an angled surface means for contacting said ring means frusto conical portion to position said frusto conical portion at an acute angle tapering toward said first end portion of the housing when said tube is inserted in said housing bore and fluid pressurized.

* * * * *